(12) United States Patent
Watson

(10) Patent No.: US 7,189,036 B1
(45) Date of Patent: Mar. 13, 2007

(54) CORING BIT

(75) Inventor: Anthony R. Watson, Hudson, NC (US)

(73) Assignee: Forest City Tool, Inc., Hickory, NC (US)

( * ) Notice: Subject to any disclaimer, the term of this patent is extended or adjusted under 35 U.S.C. 154(b) by 71 days.

(21) Appl. No.: 11/118,003

(22) Filed: Apr. 29, 2005

(51) Int. Cl.
*B23B 51/04* (2006.01)

(52) U.S. Cl. ...................... 408/204; 408/206

(58) Field of Classification Search ............. 408/79, 408/80, 201, 204, 206, 207, 209, 703; *B23B 51/04, B23B 51/05*
See application file for complete search history.

(56) References Cited

U.S. PATENT DOCUMENTS

| | | | | |
|---|---|---|---|---|
| 1,494,897 A | * | 5/1924 | Freye | 408/204 |
| 3,220,449 A | * | 11/1965 | Franklin | 408/192 |
| 4,693,644 A | * | 9/1987 | Takahashi | 408/204 |
| 4,798,503 A | * | 1/1989 | Huju | 408/211 |
| 5,681,134 A | * | 10/1997 | Ebert | 408/205 |
| 5,934,845 A | | 8/1999 | Frey | 408/68 |
| 6,007,279 A | | 12/1999 | Malone, Jr. | 408/204 |
| 6,599,063 B1 | * | 7/2003 | Capstran | 408/1 R |
| 6,786,684 B1 | | 9/2004 | Ecker | 408/204 |

FOREIGN PATENT DOCUMENTS

| | | | |
|---|---|---|---|
| FR | 2635635 A1 | * | 3/1990 |
| JP | 04105811 A | * | 4/1992 |
| JP | 04141309 A | * | 5/1992 |

* cited by examiner

*Primary Examiner*—Daniel W. Howell

(57) ABSTRACT

A coring bit provides easy core removal by utilizing a series of lateral blades which extend from the top cutting surface to the base of the bit. The lateral blades and inner faces of the coring bit are biased to provide a conical shape to the core thus permitting the core to be easily extracted. Vents positioned approximate the lateral blades allow chips, debris and waste to be quickly dispelled. Various types of small center drill bits aid in the initial coring stages.

18 Claims, 4 Drawing Sheets

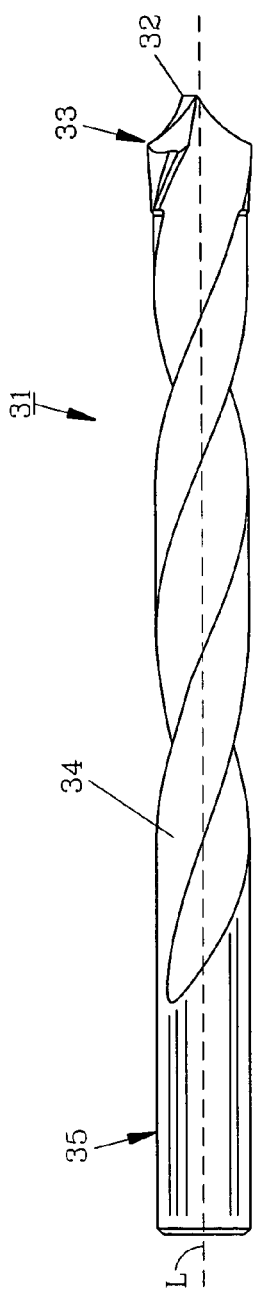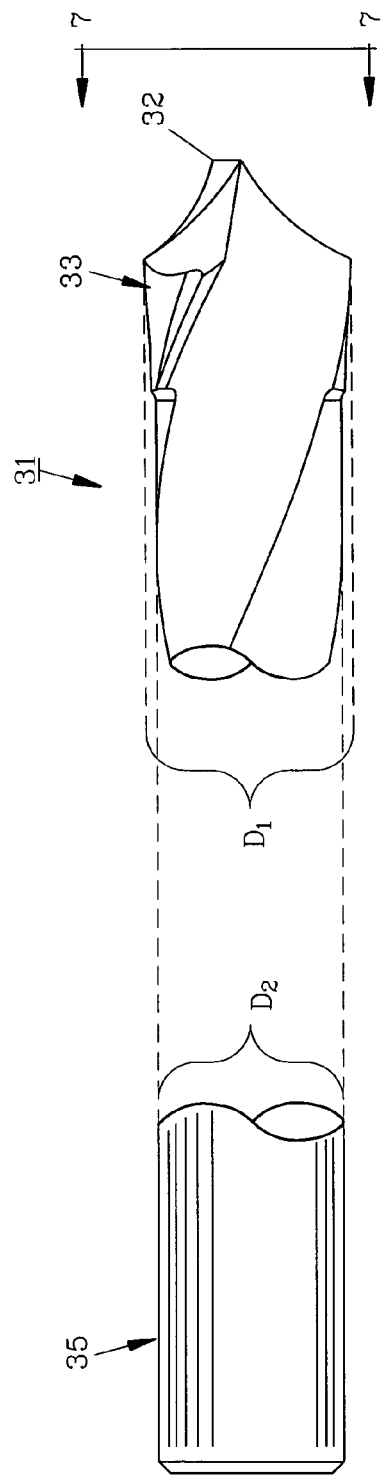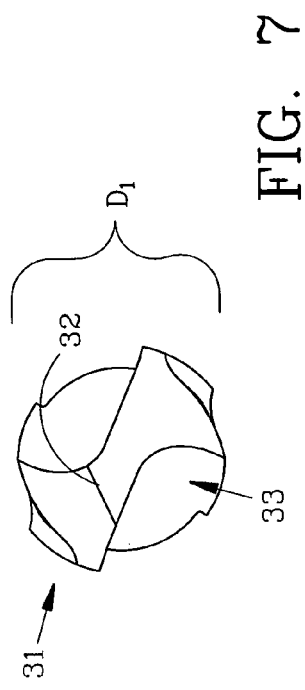
FIG. 5
FIG. 6
FIG. 7

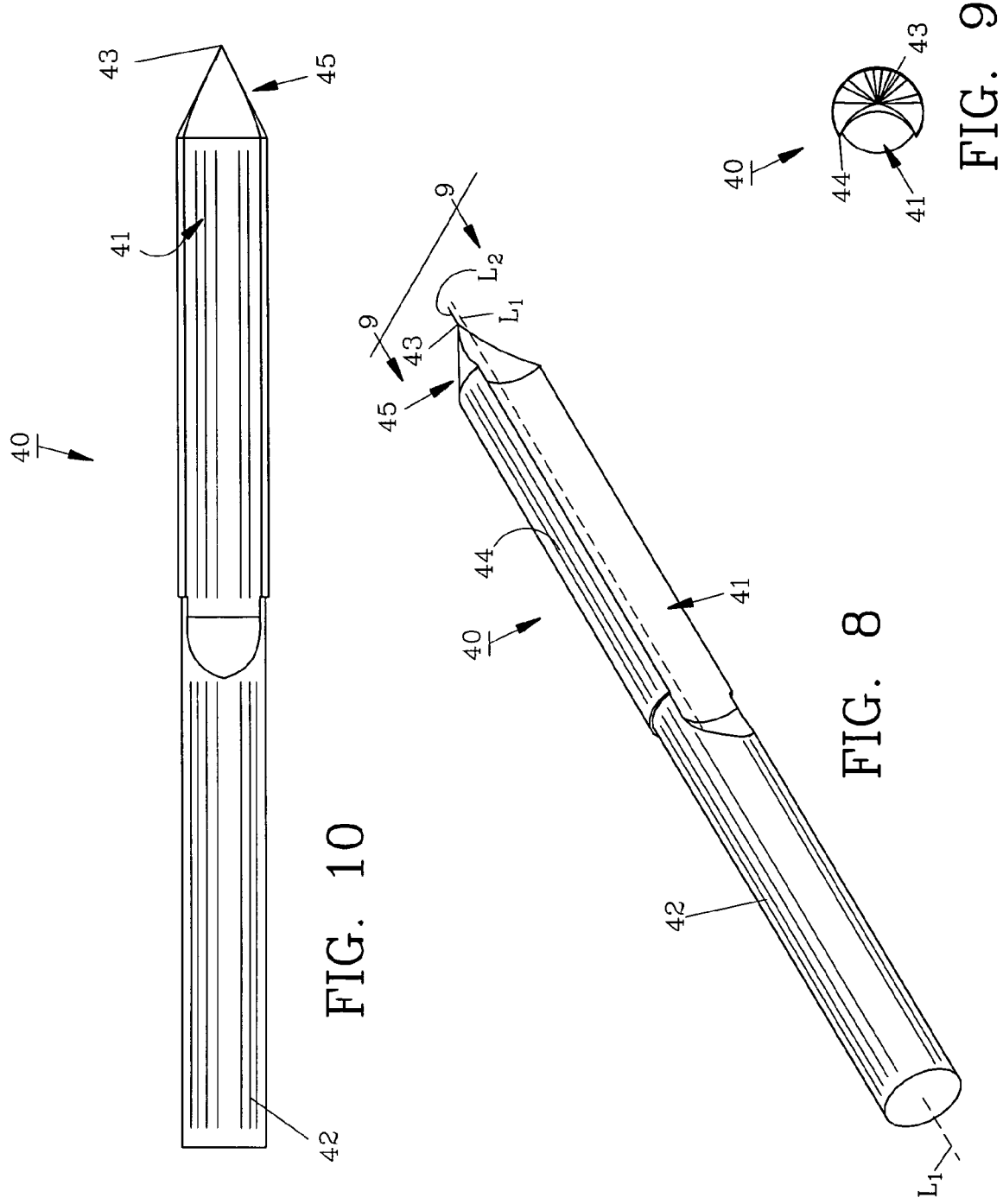

CORING BIT

FIELD OF THE INVENTION

The invention herein pertains to cutting bits as used with power tools such as electric drills and particularly pertains to cutting bits for forming large diameter apertures in various planar materials.

DESCRIPTION OF THE PRIOR ART AND OBJECTIVES OF THE INVENTION

Forming apertures in planar materials such as plywood sheets, wall board, various plastic materials and the like has been performed for many years using various types of drill bits with large diameter cutting surfaces. When removing large diameter plugs or cores of material such cores often become lodged in the drill bit requiring frequent attention, down time and maintenance. Of particular concern is the coring of thermoplastic materials which can melt and adhere to the inside of the bit, often fusing to the inner surfaces during the coring process.

Many conventional coring bits have inner and outer parallel side wall faces which increases the difficulty in removing cores and slows the drilling process, particularly when used in repetitive commercial manufacturing operations.

Therefore in view of the problems and disadvantages of conventional large diameter drill or coring bits, the present invention was conceived and one of its objectives is to provide a coring bit which is durable and can be used on a variety of materials.

It is another objective of the present invention to provide a coring bit which will allow the core to be easily removed, often only by gravitational forces.

It is still another objective of the present invention to provide a coring bit which includes lateral blades to reduce the core diameter to thus aid in removal thereof.

It is yet another objective of the present invention to provide a coring bit which has a biased interior wall face to form a conically shaped core.

It is still a further objective of the present invention to provide a coring bit which includes an alternate central drill bit with an enlarged head and an offset tip which can be easily replaced as needed.

Various other objectives and advantages of the present invention will become apparent to those skilled in the art as a more detailed description is set forth below.

SUMMARY OF THE INVENTION

The aforesaid and other objectives are realized by providing a coring bit having a head which includes a base attached to a shoulder and neck for threadably attaching a shank. The shank is inserted into a power tool such as into the chuck of an electric drill, drill press or other similar equipment. The shoulder has a threaded bore for receiving an allen screw which acts as a lock for the small center drill bit. The small center drill bit can be a standard bit or alternatively has an enlarged diameter head and a tip which is offset from the longitudinal axis thereof. Also, the center drill bit may have a single flute, similar to a router blade with an offset tip. The center drill bit is inserted into a central aperture in the base which is coincidentally aligned with a drill bit channel in the neck. The center drill bit is used to position and guide the coring bit on the selected work piece. The enlarged head and offset tip assist in removal from the core as the tip causes the bit to wobble, thereby enlarging the drilled hole. The allen screw can be loosened and the center drill bit removed as needed for sharpening, replacement, resizing or the like. Attached to the base is a substantially cylindrically shaped wall having a top or front cutting surface. The outer face of the wall is parallel to the longitudinal axis of the neck whereas the inner face is biased thereto. A series of carbide teeth are positioned as by welding, brazing or the like in the top cutting surface of the wall and a plurality of lateral blades are positioned around the wall at specific intervals. Each tooth of the cutting surface is positioned proximate a small throat to further assist in the removal of chips and debris during the coring operation. A V-shaped vent is proximate each lateral blade for chip and debris removal. The inner cutting edge of each of the lateral blades is biased to conform to the inner wall face bias and the cutting edge extends from the top of the wall to the base for continuously forming a biased edge or conically shaped core during use.

BRIEF DESCRIPTION OF THE DRAWINGS

FIG. 5 depicts an enlarged side view of an alternative center drill bit;

FIG. 6 features a further enlarged fragmented view of the alternative drill bit seen in FIG. 5;

FIG. 7 shows an end view of the head of the center drill bit as along line 7—7 of FIG. 6;

FIG. 8 demonstrates another alternate single flute center drill bit in enlarged perspective fashion for use with the invention;

FIG. 9 depicts an end view of the center drill bit as along line 9—9 as seen in FIG. 8; and FIG. 10 illustrates a side view of the center drill bit as shown in FIG. 8

DETAILED DESCRIPTION OF THE PREFERRED EMBODIMENT AND OPERATION OF THE INVENTION

Figure 1:
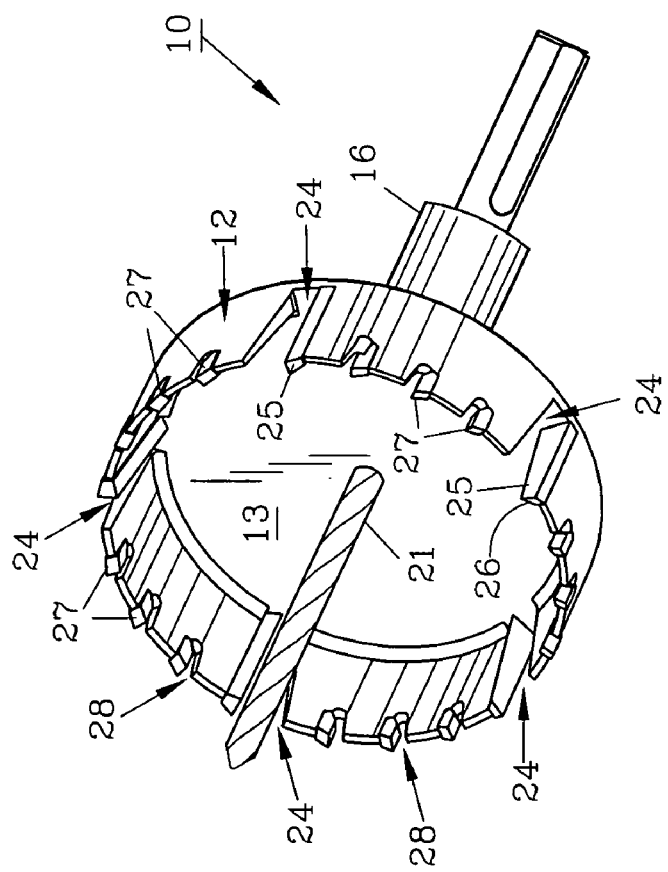
FIG. 1 shows a top perspective view of the preferred form of the coring bit of the invention.
Figure 2:
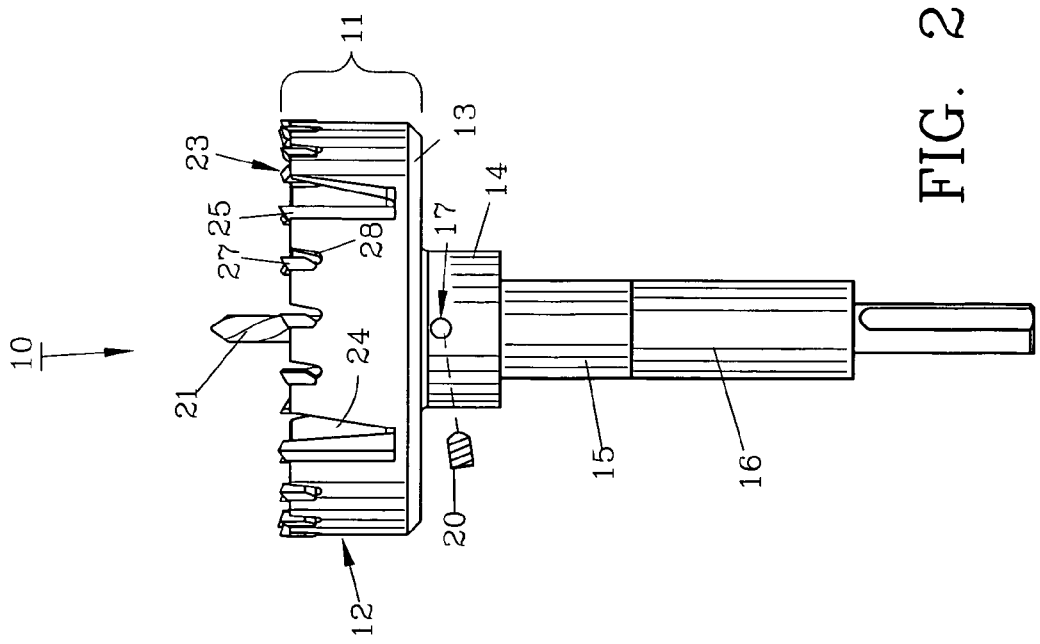
FIG. 2 illustrates a side elevational view thereof.

For a better understanding of the invention and its operation, turning now to the drawings, FIG. 1 illustrates a perspective view of preferred coring bit 10 for use with an electric power drill or the like. Coring bit 10 includes coring head 11 as illustrated in FIG. 2 including cylindrically shaped wall 12 and planar base 13. Shoulder 14 and neck 15 are also seen preferably integrally formed with base 13 in FIG. 2. Shoulder 14 includes threaded bore 17 for receiving allen screw 20 which acts as a bit lock. Base 13 includes central aperture 18 seen in FIG. 3 for receiving standard small diameter one-eighth inch (3.175 mm) center drill bit 21 which is coincidental with drill bit channel 19 extending within shoulder 14 as shown in FIG. 4. Another drill bit embodiment is seen in FIGS. 5, 6 and 7 in which center drill bit 31 with enlarged head 33 is preferably sharpened so that tip 32 is slightly off center. Head 23 is slightly larger in diameter than the diameter of shank 35. Offset tip 32 causes a slight wobble during use and the offset and enlarged head 33 cause a hole to be formed in the workpiece having a slightly larger diameter than usually formed. This larger diameter allows core 30, during removal to more easily slide from center drill 31. The tip may be formed to be only 1 mm or less off center from longitudinal axis L as seen in FIG. 5 of drill bit 31 to provide the desired wobble. Also, head 33 is slightly larger in diameter (D1) than the diameter of shank 35(D2) shown in FIG. 6. The large head diameter provides excess room in the center core for drill bit 31 and assists in core removal.

Another alternate form of the center drill bit is shown in FIGS. 8, 9 and 10. As seen, center drill bit 40 has a single flute 41 proximate cutting edge 44 similar to a typical router blade, but includes conical like head 45 with offset tip 43. Tip 43 as demonstrated in FIG. 8 is offset from longitudinal center line L1 of center drill bit 40. Reference line L2 in FIG. 8 is parallel to center line L1 to show the offset of tip 43. Shank 42 is sized to fit within central aperture 18.

Once drill bit 21 or alternative drill bits 31 or 40 is so positioned, allen screw or lock 20 is threadably tightened within bore 17 against the center drill bit shank to maintain it in place. For example, center drill bit 21 acts to start and guide coring bit 10.

As illustrated in FIGS. 1, 2 and 4 shank 16 is preferably threadably received within neck 15 as seen in FIG. 4 but may be integrally formed therewith during manufacturing. Other standard shank joints could likewise by employed such as the standard quick-change types. Coring head 11 is preferably made by usual casting techniques and machining although other methods as are conventional may likewise be used. Shank 16 can be placed in the chuck of a power drill or other tool as is standard in the trade and can be made in various sizes and lengths for different conventional chucks or other bit receivers. Steel is the preferred material for coring bit 10 but other metals may also be used for specified circumstances, depending on the exact material to be cored and the durability desired. Preferred coring bit 10 as shown in FIGS. 1–4 will form a four (4) inch (10.16 cm) opening in a 1.25" (3.175 cm) thick workpiece although any of a variety of coring bit sizes can be manufactured as desired.

Figure 3:
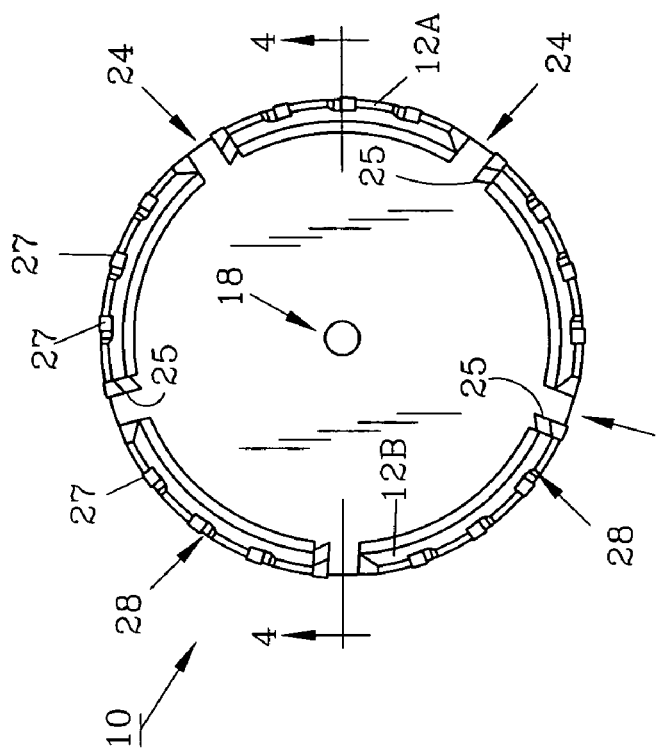
FIG. 3 pictures a top plan view of the coring bit as shown in FIG. 1 with the center drill bit removed.
Figure 4:
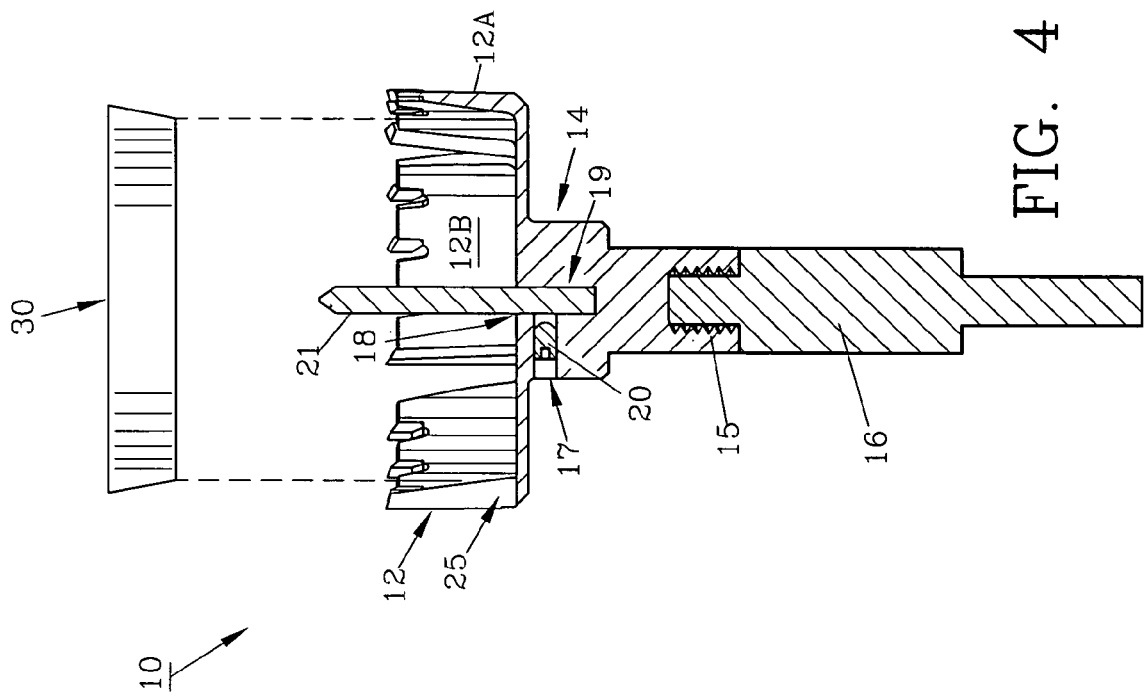
FIG. 4 demonstrates a cross sectional view of the coring bit as seen in FIG. 3 along lines 4—4 but with a standard center drill bit affixed therein and a typical core exploded therefrom.

As seen in FIG. 3, wall 12 includes a series of five (5) vents 24 each of which have a "V-shape" and each are adjacent different carbide lateral blades 25. Vents 24 help dispel dust, chips and debris during the coring process. Lateral blades 25 each have a sharp cutting edge 26 (FIG. 1) on the interior of wall 12 and extend slightly above wall 12 and continue to base 13 as shown in FIGS. 1 and 4. Lateral blades 25 reduce the diameter of core 30 (see FIG. 4) as formed to allow core 30 to be easily removed from coring bit 10 usually by only gravity. Certain thermoplastic or other work pieces which are cored often have unstable edges due in part to the heat generated during the coring process. Lateral blades 25 insure that such material, even if deformed or unstable by heating will be continuously cut during the coring operation from top cutting surface 23 (FIG. 2) to base 13 for easy removal. Also depicted in FIG. 4, wall 12 includes outer wall face 12A and inner wall face 12B which are non-parallel. Outer face 12A is parallel to the longitudinal axis of shoulder 14 whereas inner face 12B is preferably biased 7.5 degrees. This bias of inner face 12B and lateral blades 25 (having the same bias) insures that core 30 as shown in FIG. 4 is formed with a conical shape and biased edges for easy removal.

Cutting teeth 27 seen atop cutting surface 23 of wall 12 in FIGS. 1 and 2 extend slightly thereabove and are likewise carbide or similar hardened materials for durability. Teeth 27 each are mounted proximate teeth throats 28 which likewise have a V-shape as seen in FIG. 2. Such V-shape allows for efficient removal of drill dust, chips and debris and helps maintain teeth 27 in a clean condition during use for efficient cutting.

The illustrations and examples provided herein are for explanatory purposes and are not intended to limit the scope of the appended claims.

I claim:

1. A coring bit comprising:
   a) a base;
   b) a circular wall, said circular wall defining an inner face and an outer face, said inner and said outer faces angularly disposed to one another and positioned on said base;
   c) a shoulder, said shoulder attached to said base; and
   d) a first lateral blade, said first lateral blade attached to said wall interiorly thereof and extending to said base.

2. The coring bit of claim 1 wherein said wall defines a vent, said vent proximate said first lateral blade.

3. The coring bit of claim 1 wherein said base is planar.

4. The coring bit of claim 1 further comprises a cutting tooth, said cutting tooth affixed to said wall.

5. The coring bit of claim 4 wherein said wall defines a tooth throat, said tooth throat proximate said cutting tooth.

6. The coring bit of claim 1 wherein said base defines a drill bit aperture.

7. The coring bit of claim 1 wherein said shoulder defines a threaded bore.

8. The coring bit of claim 7 further comprising a bit lock, said bit lock threadably received in said bore.

9. A coring head comprising: a base, a wall, said wall affixed to said base, said wall defining a top, an inner face and an outer face, said inner face angularly disposed to said outer face, said top defining a cutting surface, a cutting tooth, said cutting tooth attached to said cutting surface, a lateral blade, said lateral blade positioned along said inner face and spaced from said cutting tooth.

10. The coring head of claim 9 wherein said lateral blade defines a cutting edge, said cutting edge extending from said top to said base.

11. The coring head of claim 9 wherein said wall defines a vent, said vent proximate said lateral blade.

12. The coring head of claim 11 wherein said vent extends from said top to said base.

13. The coring head of claim 9 wherein said cutting surface comprises a plurality of teeth, a plurality of teeth throats, each of said teeth throats proximate a different tooth.

14. The coring head of claim 9 wherein said base defines a drill bit aperture, a center drill bit, said center drill bit positioned in said drill bit aperture.

15. The coring head of claim 9 further comprising a shoulder, a neck, said neck attached to said shoulder, said shoulder attached to said base, said base defines a drill bit aperture, said shoulder defining a drill bit channel, said drill bit channel positioned contiguous said drill bit aperture.

16. The coring head of claim 14 wherein said center drill bit comprise a head, a shank, said head having a diameter larger than the shank diameter.

17. The coring head of claim 16 wherein said head defines a tip, said tip offset from said longitudinal axis of said center drill bit.

18. The coring head of claim 14 wherein said center drill bit defines a single flute.

* * * * *